Dec. 6, 1927.
H. RANGEL
NOVELTY MIRROR
Filed Dec. 20, 1926
1,651,836
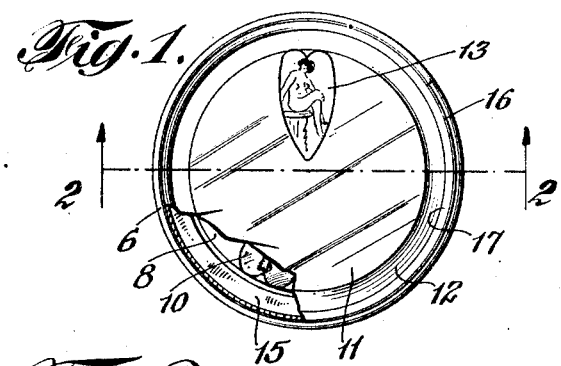
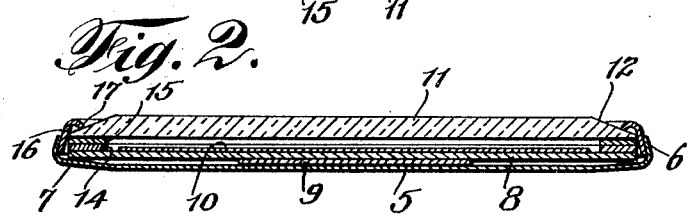
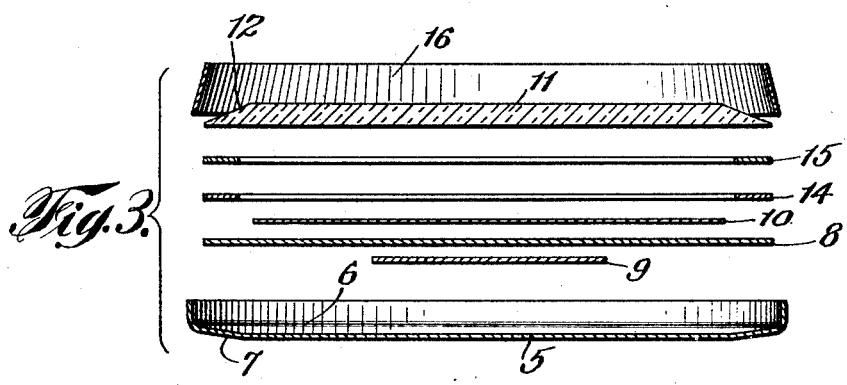
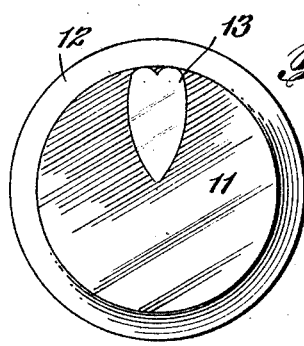
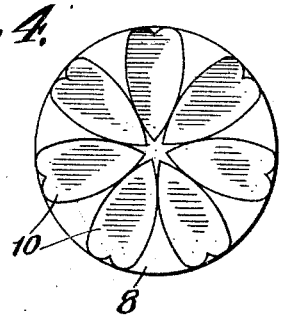
INVENTOR
Hilary Rangel,
BY
ATTORNEY Patented Dec. 6, 1927.

1,651,836

UNITED STATES PATENT OFFICE.

HILARY RANGEL, OF NEW YORK, N. Y.

NOVELTY MIRROR.

Application filed December 20, 1926. Serial No. 155,775.

This invention relates to a novelty mirror, and has for its primary object to provide a pocket mirror of simple and and inexpensive construction wherein means is provided for successively exhibiting through a transparent section of the mirror glass a series of pictures suitably mounted on the back frame of the mirror.

More particularly, in a practical embodiment of the invention, I provide a circular mirror and a correspondingly formed back or holder therefor, together with a connecting ring or annulus whereby the mirror glass and the back plate are held in assembled relation for relative rotation. Between the marginal edge of the mirror and a sheet of paper or cardboard fixed to the inner face of the back plate, suitable anti-friction means is interposed and upon the cardboard sheet a circular series of pictures are secured. A part of the silver paint on the back of the mirror is removed, or a portion of the back surface left uncoated so as to provide a transparent section of suitable design. Thus by rotating the mirror and the back plate relative to each other these pictures may be successively exposed to view through said transparent section.

With the above and other objects in view, the invention consists in the improved novelty mirror, and in the form, construction and relative arrangement of its several parts as will be hereinafter more fully described, illustrated in the accompanying drawing, and subsequently incorporated in the subjoined claims.

In the drawing, wherein I have disclosed one simple and practical embodiment of the invention, and in which similar reference characters designate corresponding parts throughout the several views,—

Figure 1 is a front elevation of the device, a part of the mirror glass being broken away;

Fig. 2 is an enlarged horizontal section taken on the line 2—2 of Fig. 1;

Fig. 3 is a similar sectional view, showing the several parts in separated relation to each other;

Fig. 4 is a detail elevation of the mirror glass, and

Fig. 5 is a detail elevation of the cardboard sheet upon which the series of photographs or pictures are secured.

As herein shown, the frame or back plate 5 for the mirror consists of a sheet metal stamping of a predetermined size, said stamping being of dish-shaped form and having a narrow annular marginal flange 6 normally extending at right angles to the inner body wall of said plate. At the inner side of said flange, the body wall is formed with a slightly inclined annular section 7.

To one side of a cardboard disc 8 at the center thereof, a relatively small paper disc 9 is secured, and said latter disc is adapted to be adhesively attached to the inner face of the back plate 5 so that the outer edge portion of the disc 8 has a yielding contact upon the inclined section 7 of the back plate. To the other face of the cardboard disc 8 a circularly arranged series of photographs or pictures as indicated at 10 are suitably secured.

The glass mirror disc 11 has an outer beveled marginal surface 12, the rear face of the glass being coated with the usual silver paint composition. In coating this surface of glass, an area of suitable size and shape is left uncoated to provide a transparent section as indicated at 13.

To the outer side of the cardboard disc 8 at the marginal edge thereof a ring or annulus 14 of fiber or other suitable material is securely fastened. A similar ring or annulus 15 is loosely arranged between the ring 14 and the inner face of the mirror disc 11. These rings serve the purpose of an anti-friction bearing which will permit of the free relative rotation of the mirror disc and the back plate 5.

The mirror disc is held in permanently assembled relation with the back plate by means of a locking ring 16 which is of the tapering form clearly shown in Fig. 3 of the drawing. One edge of this ring has an inwardly turned flange 17 formed thereon to loosely contact against the beveled face 12 of the mirror disc. In the assemblage of the parts, this locking ring 15 is adapted to be fitted within the marginal flange 6 on the back plate 5 and said flange then subjected to pressure and slightly bent inwardly against the ring 16 thus frictionally connecting said ring with the flange of the back plate.

The manner of assemblage of the several parts will be clearly evident from an inspection of Fig. 3 of the drawing. By thus loosely supporting the mirror disc 11 in connection with the back plate 5, the mirror may be held stationary by engaging the fingers of one hand upon the beveled edge 12 thereof so that upon rotating the back plate 5, the series of pictures or photographs 10 carried thereby may be successively exposed to view through the transparent section 13 of the mirror disc.

I have herein shown a structural embodiment of my present improvements which I have found to be quite practical. Nevertheless, it will be understood that various minor modifications might be resorted to in the manner of construction and assemblage of the several elements, and I therefore reserve the privilege of embodying the several features of the invention in such other alternative structures as may be fairly incorporated within the spirit and scope of the invention as claimed.

I claim:

1. A novelty mirror comprising a back plate having a circularly arranged series of pictures attached to its inner face, a mirror disc having a transparent section with which said pictures are adapted to register, said back plate having a marginal flange thereon, and a locking ring frictionally engaged with the inner face of said flange and having an inwardly turned edge loosely contacting upon the marginal edge of the mirror disc and permanently connecting said back plate and the mirror disc for relative rotation whereby the pictures may be successively exposed to view through the transparent section of said disc.

2. A novelty mirror comprising a back plate hving a circularly arranged series of pictures attached to its inner face, a mirror disc having a transparent section with which said pictures are adapted to register, said back plate having a marginal flange thereon, a locking ring frictionally engaged with the inner face of said flange and having an inwardly turned edge loosely contacting upon the marginal edge of the mirror disc and permanently connecting said back plate and the mirror disc for relative rotation whereby the pictures may be successively exposed to view through the transparent section of said disc, and anti-friction spacing means interposed between the rear face of the mirror disc at its marginal edge and said back plate.

3. A novelty mirror comprising a back plate having a marginal flange, a cardboard disc secured at its central portion to the inner face of the back plate and loosely contacting with the back plate at its marginal portion, a circular series of pictures secured to the outer face of said cardboard disc, a mirror disc having a transparent section, the outer face of said disc at its marginal edge being beveled, a locking ring frictionally engaged with the inner face of the flange on the back plate, and having an inwardly turned edge loosely contacting with the beveled marginal face of the mirror disc and connecting said disc and back plate for relative rotation whereby the pictures may be successively exposed to view through the transparent section of the mirror disc, and anti-friction members interposed between the rear face of the mirror disc and the marginal edge of the cardboard disc and spacing the same from each other.

In testimony that I claim the foregoing as my invention, I have signed my name hereto.

HILARY RANGEL.